United States Patent
Spahlinger

(10) Patent No.: US 8,424,382 B2
(45) Date of Patent: Apr. 23, 2013

(54) MICROELECTROMECHANICAL SENSOR AND OPERATING METHOD FOR A MICROELECTROMECHANICAL SENSOR

(75) Inventor: Guenter Spahlinger, Stuttgart (DE)

(73) Assignee: Northrop Grumman LITEF GmbH, Freiburg (DE)

(*) Notice: Subject to any disclaimer, the term of this patent is extended or adjusted under 35 U.S.C. 154(b) by 579 days.

(21) Appl. No.: 12/310,572

(22) PCT Filed: Aug. 8, 2007

(86) PCT No.: PCT/EP2007/007028
§ 371 (c)(1),
(2), (4) Date: Feb. 27, 2009

(87) PCT Pub. No.: WO2008/031480
PCT Pub. Date: Mar. 20, 2008

(65) Prior Publication Data
US 2010/0186503 A1 Jul. 29, 2010

(30) Foreign Application Priority Data
Sep. 15, 2006 (DE) .......................... 10 2006 043 412

(51) Int. Cl.
*G01C 19/56* (2012.01)
(52) U.S. Cl.
USPC ....................................................... 73/504.12
(58) Field of Classification Search ............... 73/504.12, 73/504.14, 504.16
See application file for complete search history.

(56) References Cited

U.S. PATENT DOCUMENTS

| | | | |
|---|---|---|---|
| 5,992,233 A | 11/1999 | Clark et al. | |
| 6,067,858 A | 5/2000 | Clark et al. | |
| 6,250,156 B1 | 6/2001 | Seshia et al. | |
| 6,934,660 B2 * | 8/2005 | Painter et al. | 702/141 |
| 7,805,993 B2 | 10/2010 | Spahlinger | |
| 2004/0199347 A1 | 10/2004 | Painter et al. | |
| 2006/0250194 A1 | 11/2006 | Spahlinger | |

FOREIGN PATENT DOCUMENTS

| | | |
|---|---|---|
| DE | 69521805 | 12/1995 |
| DE | 10360963 | 7/2005 |
| DE | 102004056699 | 6/2006 |
| EP | 1046883 | 10/2000 |
| WO | 03014669 | 2/2003 |
| WO | 2004015429 | 2/2004 |
| WO | 2004038331 | 5/2004 |
| WO | 2004099716 | 11/2004 |

* cited by examiner

*Primary Examiner* — John Chapman, Jr.
(74) *Attorney, Agent, or Firm* — Elliott N. Kramsky

(57) ABSTRACT

A microelectromechanical sensor and operating method therefor. The sensor has at least one movable electrode. An electrode arrangement is spaced apart from the movable electrode with a plurality of electrodes that can be driven separately and to which corresponding electrode signals can be applied that can be used to electrostatically set/change the application of force, the spring constant and the read-out factor of the movable electrode. An electrode signal generation unit is connected to the electrode arrangement and can be supplied with a force application signal, a spring constant signal and a read-out factor signal, which define the settings/changes to be brought about with regard to the application of force, spring constant and read-out factor of the movable electrode. The electrode signal generation unit generates each electrode signal in a manner dependent on the force application signal, the spring constant signal and the read-out factor signal and matches the electrode signals to one another so that the application of force, the spring constant and the read-out factor of the movable electrode can be set/changed to specific desired values independently of one another.

11 Claims, 3 Drawing Sheets

MICROELECTROMECHANICAL SENSOR AND OPERATING METHOD FOR A MICROELECTROMECHANICAL SENSOR

BACKGROUND

1. Field of the Invention

The present invention relates to microelectromechanical sensors. More particularly, this invention pertains to a microelectromechanical sensor and a method for operating such microelectromechanical sensor.

2. Description of the Prior Art

Microelectromechanical sensors are integral to many technical devices. They have proved to be advantageous, for example, in the field of navigation, where they are employed as Coriolis gyroscopes. (The functioning of a microelectromechanical sensor is explained below with reference to a Coriolis gyroscope.)

Coriolis gyroscopes include a mass system that can be caused to effect oscillations. The mass system generally possesses a multiplicity of oscillation modes that are initially independent of one another. In the operating state (i.e. in the operating state of the microelectromechanical sensor), a specific oscillation mode of the mass system is excited artificially ("excitation oscillation"). When the Coriolis gyroscope is rotated, Coriolis forces occur that draw energy from the excitation oscillation of the mass system and transfer it to a further oscillation mode of the mass system ("read-out oscillation"). In order to determine rotations of the Coriolis gyroscope, the read-out oscillation is tapped off and a corresponding read-out signal examined for changes in the amplitude of the read-out oscillation which provide a measure of the rotation of the gyroscope. Coriolis gyroscope may comprise either an open-loop or a closed-loop system. In a closed-loop system, the amplitude of the read-out oscillation is continuously reset to a fixed value (preferably zero) by means of associated control loops, and the resetting forces measured.

The mass system ("resonator") of the Coriolis gyroscope (the microelectromechanical sensor) can be configured in a variety of ways. It is possible to arrange a mass system in one piece or to divide the mass it into two oscillators, coupled to one another via a spring system, that are capable of performing relative movements with respect to one another.

FIG. 1 is a schematic illustration of a Coriolis gyroscope 20 in accordance with the prior art. It includes a charge amplifier 1, an analog-to-digital converter 2, a signal separation 3, demodulators 4, 5, a control system 6, a modulator 7, drivers 8, 9, a resonator 10 and an electrode system 11 having four electrodes $11_1$ to $11_4$. The resonator 10 can be excited by means of the electrodes $11_3$ to $11_4$ to cause oscillations. Furthermore, the spring constant of the resonator 10 can be electrostatically set or changed by the electrodes $11_1$ to $11_4$. Movement of the resonator 10 is determined by measuring a charge transfer $\Delta q$ on an electrode provided on the resonator 10 ("movable center electrode"), which is caused by movement of the resonator 10 within the electrostatic field generated by the electrodes $11_1$ to $11_4$. A signal $S_7$, proportional to the charge transfer, is output by the charge amplifier 1 to the analog-to-digital converter 2 and converted by the latter into a corresponding digital signal $S_8$ that is fed to the signal separation 3. Signals $S_3$ to $S_6$ are generated from this signal with the aid of the demodulators 4, 5, the control system 6 and the modulator 7 and the drivers 8, 9. Such signals are applied to the electrodes $11_1$ to $11_4$ so that deflections of the resonator 10 caused by Coriolis forces are compensated. Details of the operation of the Coriolis gyroscope 20, are provided, for example, in German patent specification DE 103 20 675.

SUMMARY AND OBJECTS OF THE INVENTION

It is an object of the invention to specify a microelectromechanical sensor, for example a capacitive sensor or a piezoelectric sensor, that possesses maximum functionality with a limited number of sensor electrodes.

The invention addresses the foregoing and other objects by providing, in a first aspect, a microelectromechanical sensor. Such sensor includes at least one movable electrode. An electrode arrangement is spaced apart from the movable electrode. It has a plurality of electrodes that can be driven separately. Corresponding electrode signals can be applied to the electrodes that can be used to electrostatically set/change the application of force, the spring constant and the read-out factor of the movable electrode.

An electrode signal generation unit, connected to the electrode arrangement, can be supplied with a force application signal, a spring constant signal and a read-out factor signal that define the settings and/or changes to be brought about with regard to the application of force, spring constant and read-out factor of the movable electrode. As a result, the electrode signal generation unit generates each electrode signal in a manner dependent upon the force application signal, the spring constant signal and the read-out factor signal. It matches the electrode signals to one another so that the application of force, the spring constant and the read-out factor of the movable electrode can be set and/or changed to specific desired values independently of one another.

In another aspect, the invention provides an operating method for a microelectromechanical sensor having a movable electrode, an electrode arrangement spaced apart from the movable electrode and a plurality of electrodes which can be driven separately and to which corresponding electrode signals can be applied. Such method includes generating the electrode signals in a manner dependent on a force application signal, a spring constant signal and a read-out factor signal, that define the settings and/or changes to be made with regard to the movement, spring constant and read-out factor of the movable electrode.

The electrode signals are applied to the corresponding electrodes to electrostatically set and/or change the application of force, the spring constant and the read-out factor of the movable electrode. As a result, each electrode signal is generated dependent on the force application signal, the spring constant signal and the read-out factor signal. The electrode signals are matched to one another so that the application of force, the spring constant and the read-out factor of the movable electrode are set and/or changed to specific desired values independently of one another.

The preceding and other features of the invention will become further apparent from the detailed description that follows. Such description is accompanied by a set of drawing figures. Numerals of the drawing figures correspond to those of written description, with like numerals referring to like features throughout both the written description and the drawing figures.

DETAILED DESCRIPTION OF THE PREFERRED EMBODIMENT

Figure 1:
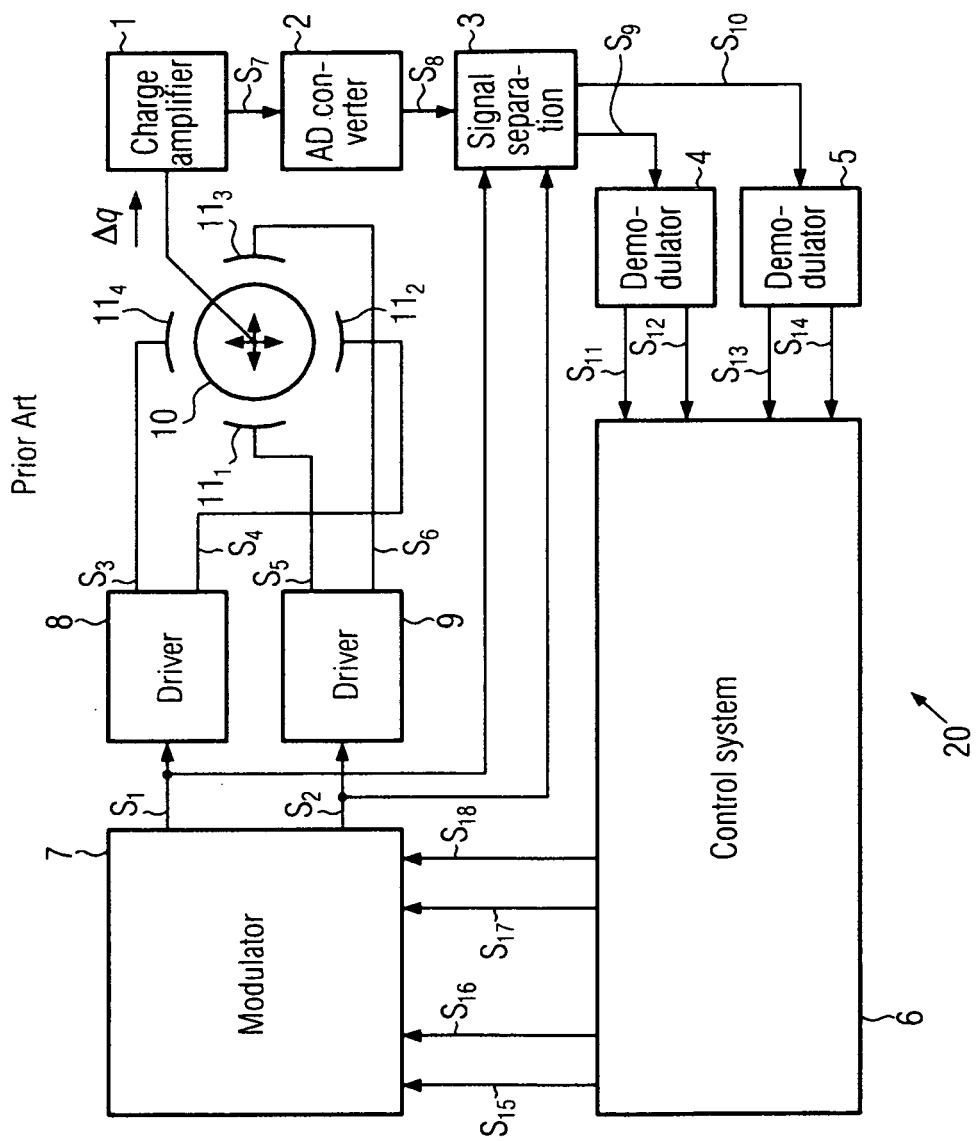
FIG. 1 is a schematic diagram of a microelectromechanical sensor (Coriolis gyroscope) in accordance with the prior art.
Figure 2:
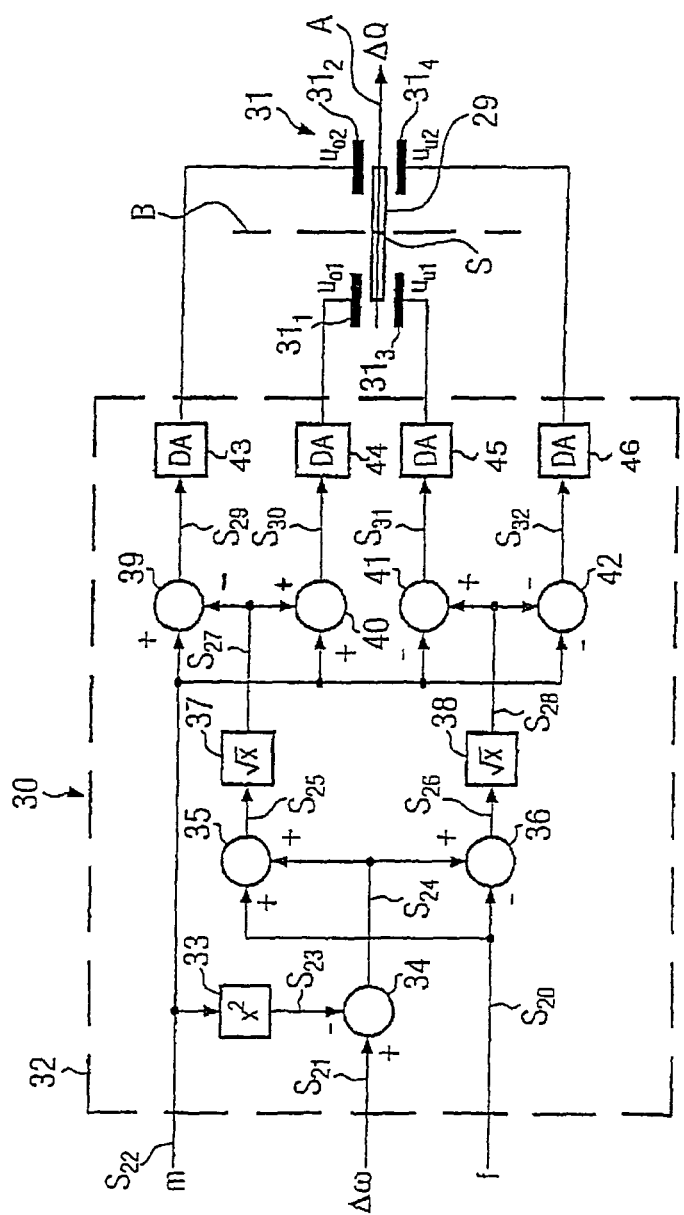
FIG. 2 illustrates an embodiment of a microelectromechanical sensor in accordance with the invention having a single movable electrode.

FIG. 2 illustrates an embodiment of a microelectromechanical sensor 30 in accordance with the invention having a single moveable electrode. This figure can be compared approximately with the "ensemble" of modulator 7, drivers 8, 9, resonator 10 and electrode arrangement $11_1$ to $11_4$ of FIG. 1.

An electrode arrangement 31 is spaced in relation to a movable electrode 29 that can, for example, be part of a resonator (not shown). The electrode arrangement comprises first to fourth electrodes $31_1$ to $31_4$. The first and third electrodes $31_1$, $31_3$, and the second and fourth electrodes $31_2$, $31_4$, form electrode pairs. The electrodes of an electrode pair are arranged axially symmetrically with respect to an axis A. They are separated from one another axially symmetrically by an axis B perpendicular to the axis A. The movable electrode 29 is configured, for example, centrosymmetrically with respect to a point of intersection S of the two axes of symmetry A, B, as shown in FIG. 2.

An electrode signal generation unit 32 may be supplied with a force application signal $S_{20}$ (designated "f"), a spring constant signal $S_{21}$ (designated "$\Delta\omega$"), and a read-out factor signal $S_{22}$ (designated "m"). The read-out factor signal $S_{22}$ is squared in a squaring unit 33 and the signal $S_{23}$ output is fed with a negative sign to a first addition stage 34, where it is added to the spring constant signal $S_{21}$. The output signal $S_2$ of the addition stage 34 is fed to second and third addition stages 35 and 36 respectively. The signal $S_{24}$ is added to the signal $S_{20}$ in the second addition stage 35 while the signal $S_{20}$, with a negative sign, is added to the signal $S_{24}$ in the third addition stage 36. The output signals $S_{25}$, $S_{26}$ of the addition stages 35, 36 are fed to root units 37, 38, respectively that determine the root from one of the signals $S_{25}$ and $S_{26}$. The output signals $S_{27}$, $S_{28}$ of the root units 37, 38 are fed to fourth to seventh addition stages 39 to 42, by which each of such signals is in each case added to and subtracted from the signal $S_{22}$ once. Output signals $S_{29}$ to $S_{32}$ are fed to digital-to-analog converters 43 to 46 that convert the (previously digital) signals into analog signals $u_{o1}$, $u_{o2}$, $u_{u1}$, $u_{u2}$ and apply them to the corresponding electrodes $31_1$ to $31_4$. The signals $u_{o1}$, $u_{o2}$, $u_{u1}$ and $u_{u2}$ represent the electrode signals in the sense of the invention and can be expressed as follows as a function of the force application signal $S_{20}$ (=f), the spring constant signal $S_{21}$ (=$\Delta\omega$) and the read-out factor signal $S_{22}$ (=m):

$$u_{o1} = \sqrt{\Delta\omega - m^2 + f} + m \tag{1}$$

$$u_{o2} = -\sqrt{\Delta\omega - m^2 + f} + m \tag{2}$$

$$u_{u1} = \sqrt{\Delta\omega - m^2 - f} - m \tag{3}$$

$$u_{u2} = -\sqrt{\Delta\omega - m^2 - f} - m \tag{4}$$

The electrode signals $u_{o1}$, $u_{o2}$ represent the electrode signals present at the electrodes $31_1$, $31_2$ situated above the axis A while $u_{u1}$, $u_{u2}$ represent the electrode signals at the electrodes $31_3$, $31_4$ situated below the axis A. The connection of the movable electrode 29 is at virtual ground and the charge flowing from the movable electrode 29 measured.

Figure 3A:
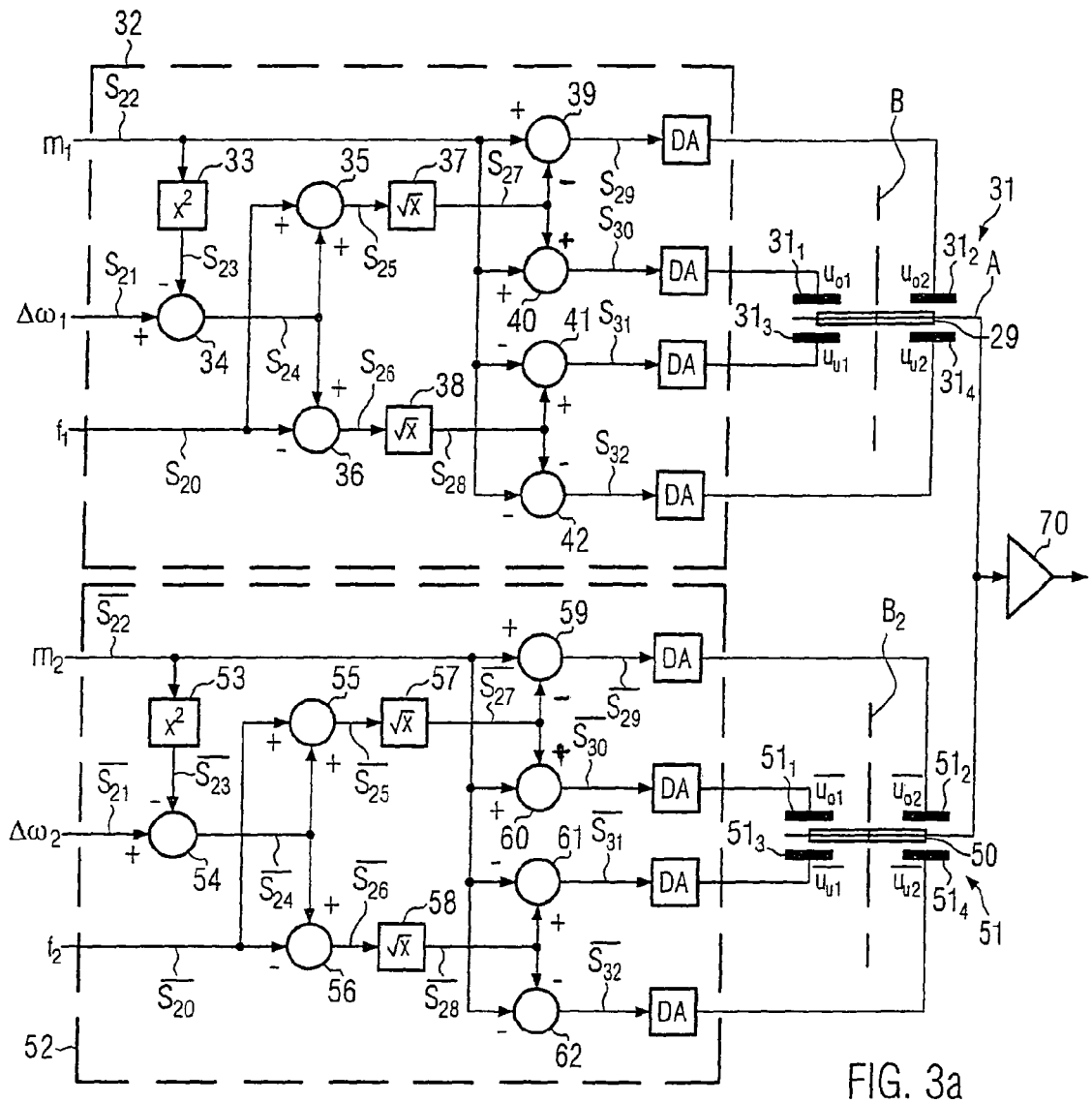
FIGS. 3a and 3b are a micromelectromechanical sensor in accordance with an alternative embodiment of the invention having two movable electrodes and a timing diagram for the application of two read-out factors, respectively.
Figure 3B:
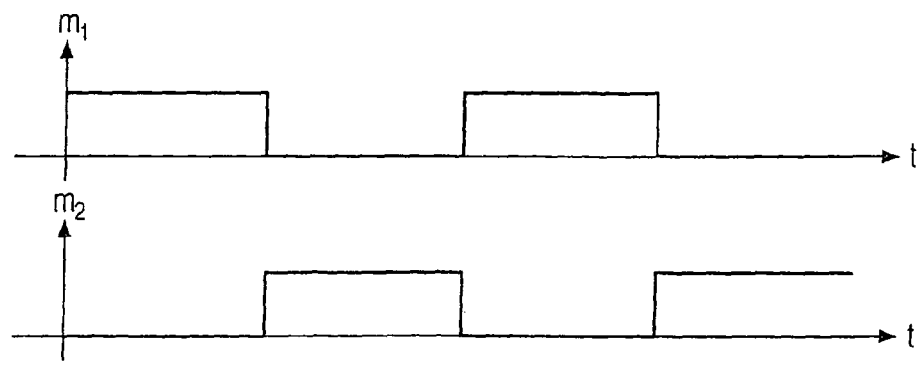

FIG. 3(a) illustrates two movable, electrically connected electrodes 29, 50 combined in multiplex. The control signals $m_1$ and $m_2$, switched in accordance with the timing diagram of FIG. 3(b), alternately connect a respective movable electrode 29, 50 visible to the charge amplifier 70. The force impressions $f_1$ and $f_2$ and the matchings $\Delta\omega_1$ and $\Delta\omega_2$ can be chosen independently thereof.

An electrode arrangement 51 is spaced apart in relation to a second movable electrode 50 that is electrically connected to at least one movable electrode 29. The electrode arrangement comprises first to fourth electrodes $51_1$ to $51_4$. The first and third electrodes $51_1$, $51_3$, and the second and fourth electrodes $51_2$, $51_4$, respectively form an electrode pair. The electrodes of an electrode pair are arranged axially symmetrically with respect to an axis $A_2$. They are separated from one another axially symmetrically relative to one another by an axis $D_2$ perpendicular to the axis $A_2$.

A second electrode signal generation unit 52 can be seen that can be supplied with a second force application signal $\overline{S_{20}}$ (designated "$f_2$"), a second spring constant signal $\overline{S_{21}}$ (designated "$\Delta\omega_2$"), and a second read-out factor signal $\overline{S_{22}}$ (designated "$m_2$"). The second read-out factor signal $\overline{S_{22}}$ is squared in a second squaring unit 53 and the signal $\overline{S_{23}}$ thus obtained is fed with a negative sign to an eighth addition stage 54 where it is added to the second spring constant signal $\overline{S_{21}}$. The output signal $\overline{S_{24}}$ of the eighth addition stage 54 is fed to ninth and tenth addition stages 55 and 56. In the ninth addition stage 55, the signal $\overline{S_{24}}$ is added to the signal $\overline{S_{20}}$, whereas in the tenth addition stage 56, the signal $\overline{S_{20}}$, with a negative sign, is added to the signal $\overline{S_{24}}$. The output signals $\overline{S_{25}}$, $\overline{S_{26}}$ of the addition stages 55, 56 are fed to second root units 57, 58, which respectively determine the root from one of the signals $\overline{S_{25}}$, $\overline{S_{26}}$. The output signals $\overline{S_{27}}$, $\overline{S_{28}}$ of the second root units 57, 58 are fed to eleventh to fourteenth addition stages 59 to 62, by means of which each of the signals $\overline{S_{27}}$, $\overline{S_{28}}$ is in each case added to the signal $\overline{S_{22}}$ once and subtracted from it once. Corresponding output signals $\overline{S_{29}}$ to $\overline{S_{32}}$ are fed to second digital-to-analog converters 63 to 66 that convert the (formerly digital) signals into analog signals $\overline{u_{o1}}$, $\overline{u_{o2}}$, $\overline{u_{u1}}$, $\overline{u_{u2}}$ and apply them to the corresponding electrodes $51_1$ to $51_4$. The signals $\overline{u_{o1}}$, $\overline{u_{o2}}$, $\overline{u_{u1}}$ and $\overline{u_{u2}}$ represent the electrode signals in the sense of the invention and can be expressed as a function of the second force application signal $\overline{S_{20}}$, the second spring constant signal $\overline{S_{21}}$ and the second read-out factor signal $\overline{S_{22}}$:

$$\overline{u_{o1}} = \sqrt{\Delta\omega_2 - m_2^2 + f_2} + m_2 \tag{5}$$

$$\overline{u_{o2}} = -\sqrt{\Delta\omega_2 - m_2^2 + f_2} + m_2 \tag{6}$$

$$\overline{u_{u1}} = \sqrt{\Delta\omega_2 - m_2^2 - f_2} - m_2 \tag{7}$$

$$\overline{u_{o2}} = -\sqrt{\Delta\omega_2 - m_2^2 - f_2} - m_2 \tag{8}$$

Accordingly, the electrode signals $\overline{u_{o1}}$, $\overline{u_{o2}}$ represent those present at the electrodes $51_1$, $51_2$ situated above the axis $A_2$, and $\overline{u_{u1}}$, $\overline{u_{u2}}$ represent the electrode signals present at the electrodes $51_3$, $51_4$ situated below the axis $A_2$.

It is advantageous if the following requirements can be met during the operation of (capacitive) microelectromechanical sensors for measuring acceleration or rate of rotation:

1. A defined, electrostatically generated force is exerted on a movable electrode (torquer function).

2. A defined, electrostatically generated spring force is applied to the same movable electrode. The spring constant is generally negative and is intended to make a positive mechanical spring "softer" to a predetermined extent to enable a defined tuning of the natural resonance of a mechanical oscillator.

3. The deflection of the electrode is made measurable by means of a read-out factor that can be set (pick-off function).

4. The measurement signal does not to contain any other components than those dependent on the deflection and the read-out factor.

Assume that a capacitor having a movable electrode is provided. The electrode can be moved by a deflection x at an actuation point. The capacitance is then dependent on x: $C=C(x)$. It follows from the energy theorem that, in the case of a voltage U applied to the capacitor at the actuation point, an electrostatic force $$F = \frac{U^2}{2}\frac{dC}{dx} \qquad (9)$$

takes effect. The differential capacitor was two capacitors with a common actuation point, wherein $$C_1(x)=C_2(-x) \qquad (10)$$

holds true. It is then the case that approximately:

$$C_1(x)=C_0(1+\alpha_1 x+\alpha_2 x^2) \qquad (11)$$

and thus $$C_2(x)=C_0(1-\alpha_1 x+\alpha_2 x^2) \qquad (12)$$

If the voltages $U_1$ and $U_2$ are then present at the capacitors, the force at the actuation point of the movable electrode becomes:

$$F = \frac{U_1^2}{2}\frac{dC_1}{dx} + \frac{U_2^2}{2}\frac{dC_2}{dx} \qquad (13)$$

Substituting (11) and (12) yields:

$$F=(U_1^2-U_2^2)\alpha_1 C_0+2x(U_1^2+U_2^2)\alpha_2 C_0 \qquad (14)$$

Consequently, the force is composed of a part that is independent of x and a portion that is proportional to x and corresponds to a spring constant. The part independent of x is proportional to $U_1^2-U_2^2$, and the spring constant is proportional to $U_1^2+U_2^2$.

In the case of four capacitors where $$C_{o1}(x)=C_{o2}(x)=C_0(1+\alpha_1 x+\alpha_2 x^2) \qquad (15)$$

$$C_{u1}(x)=C_{u2}(x)=C_0(1-\alpha_1 x+\alpha_2 x^2) \qquad (16)$$

the following holds true for the force:

$$F(U_{o1}^2+U_{o2}^2-U_{u1}^2-U_{u2}^2)\alpha_1 C_0+2x(U_{o1}^2+U_{o2}^2+U_{u1}^2+U_{u2}^2)\alpha_2 C_0 \qquad (17)$$

Here, therefore, the distance-independent term is proportional to $$U_{o1}^2+U_{o2}^2-U_{u1}^2-U_{u2}^2 \qquad (18)$$

and the spring constant is proportional to $$U_{o1}^2+U_{o2}^2+U_{u1}^2+U_{u2}^2 \qquad (19)$$

The distance-independent part is suitable for impressing a desired force (resetting, torquer), and the spring constant, in interaction with a spring-mass system, enables the tuning of the latter to a desired resonant frequency.

The following holds true for the charges:

$$Q=C_{o1}U_{o1}+C_{o2}U_{o2}+C_{u1}U_{u1}+C_{u2}U_{u2} \qquad (20)$$

Substituting (15) and (16), and disregarding the quadratic term, yields:

$$Q=2C_0(U_{o1}+U_{o2}+U_{u1}+U_{u2}) \qquad (21)$$

$$+2C_0(U_{o1}+U_{o2}-U_{u1}-U_{u2})\alpha_1 x \qquad (22)$$

The first term generates a crosstalk independent of x (and is generally undesirable), while the second part is proportional to x, and is therefore suitable for reading out the deflection x. If the quadratic term is taken into account, then $$Q=2C_0(U_{o1}+U_{o2}+U_{u1}+U_{u2})(1+\alpha_2 x^2) \qquad (23)$$

$$+2C_0(U_{o1}+U_{o2}-U_{u1}-U_{u2})\alpha_1 x \qquad (24)$$

and it vanishes together with the constant term (if the crosstalk is made zero, i.e. for $U_{o1}+U_{o2}+U_{u1}+U_{u2}=0$).

Requirements 1.)- 3.) can be met independently of one another with the sensor and operating method according to the invention. It is therefore possible both for a force to be able to be applied without a read-out signal being generated and, conversely, for a read-out factor different than zero, no applied force having to be the necessary consequence.

For general electrode arrangements it is possible to establish systems analogous to the equations if the following rules are taken into account:

The charges on all the electrodes always have a magnitude such that: 1) in total, at the charge amplifier input, there are no terms independent of the deflection x; 2) in total, at the charge amplifier input, there is a part dependent on the deflection x and having a gain factor that can be set; 3) there is a force effect that can be set, independently of the deflection x, on the movable electrode; and 4) there is an electrostatic spring that can be set, in terms of its spring constant, at the movable electrode.

The read-out factor that can be set can be used to realize e.g. a "down-converting detector" if, for example, the read-out factor is configured as a sinusoidal carrier having the same frequency as the electrode oscillation. In this case, the oscillation is down-converted to the frequency 0, which leads to a phase-sensitive demodulator. Furthermore, by means of the read-out factor that can be set, the read-out functions of a plurality of oscillators whose movable electrodes are electrically connected can be read out in the time division multiplex method by a procedure in which it is always the case that only the read-out factor of one oscillator is set to a value different than zero. Accordingly, it is always the case that only one oscillator movement is detected by the common charge amplifier in temporal succession. The read-out function $$Q(\Delta x) = U\left(C_0 + \frac{\partial C}{\partial x}\Delta x\right) \qquad (25)$$

based on a capacitance measurement generally has the effect that, when the read-out factor is switched on by means of the voltage U, not only a component dependent on the deflection $\Delta x$ but, at the same time, a considerably larger portion dependent on the quiescent capacitance $C_0$ occurs. The method according to the invention suppresses this undesirable portion, as is shown below on the basis of the nomenclature in FIG. 2.

The force acting on the movable electrode 29, according to equation (18) is proportional to $$u_{o1}^2+u_{o2}^2-u_{u1}^2-u_{u2}^2=4f \qquad (26)$$

Requirement 1 is thus met. The detuning due to an electrostatic spring, according to equation (19) is proportional to $$u_{o1}^2+u_{o2}^2+u_{u1}^2+u_{u2}^2=4\Delta\omega \qquad (27)$$

Requirement 2 is thus met. The read-out factor, according to equation (21) is proportional to $$u_{o1}+u_{o2}-u_{u1}-u_{u2}=4m \qquad (28)$$

The third requirement is thus met. Furthermore, according to equation (22), $$u_{o1}+u_{o2}+u_{u1}+u_{u2}=0 \qquad (29)$$

whereby, finally, the fourth requirement is met. For a correct function, the dimensioning must be performed such that always $$|f|<\Delta\omega-m^2 \qquad (30)$$

The invention accordingly describes an operating method for microelectromechanical sensors (MEMS sensors) with split electrodes. The method according to the invention allows excitation force, resonance tuning and read-out factor to be set separately from one another in systems comprising a plurality of electrically coupled movable electrodes. A read-out process during multiplex operation is thus possible totally independent of excitation processes (generation of the excitation oscillation) and tuning processes (e.g. frequency tuning of excitation oscillation to read-out oscillation in order to obtain a double-resonant resonator).

An essential insight on which the invention is based is that the electrode signals for any desired electrode arrangement can be matched to one another in such a way that the application of force, the spring constant and the read-out factor of the movable electrode can be set/changed to specific desired values independently of one another. This affords maximum flexibility of the operating method of the microelectromechanical sensor. In this context, "any desired electrode arrangement" means any desired spatial arrangement of at least three electrodes.

As mentioned, the mass system (i.e., resonator) of the microelectromechanical sensor can be configured in a variety of ways. For example, it is possible to use a mass system embodied in one piece. As an alternative, it is possible to divide the mass system into two oscillators, which can perform relative movements with respect to one another that are coupled to one another via a spring system.

In one embodiment, the sensor according to the invention is provided with a charge transfer unit that detects charge transfers occurring on the movable electrode. In this way the instantaneous movement of the movable electrode can be determined by means of an evaluation unit, on the basis of the detected charge transfer.

In one embodiment, the electrode signal generation unit generates each electrode signal in a manner dependent on the force application signal, the spring constant signal and the read-out factor signal in such a way that the charge transfer detected on the movable electrode only contains charge transfer components that originate from the movement of the movable electrode and from the value of the read-out factor. In this case, the read-out factor should be interpreted as a gain factor for reading out the movement of the movable electrode.

The electrode arrangement can comprise an even or odd number of electrodes. The dimensions and configurations of the individual electrodes can differ. In one preferred embodiment, the electrode arrangement contains four (preferably identical) electrodes that can be grouped, for example, into two electrode pairs. The electrodes are configured axially symmetrically with respect to a first axis, which separates the two electrode pairs from one another, and axially symmetrically with respect to a second axis, which separates the electrodes of the respective electrode pairs among one another. In an advantageous manner, the movable electrode is configured centrosymmetrically with respect to the point of intersection of the two axes of symmetry.

In an embodiment in which the movable electrode is embodied as part of a resonator, the movable electrode can be excited to effect oscillations and the sensor can be used, for example, as a Coriolis gyroscope.

In an embodiment comprising two movable electrodes, two electrode arrangements and two electrode signal generation units, both movable electrodes can be read separately from one another by a corresponding choice of the two read-out factors and the movements (influenced by means of the application of force) and spring constants can be set independently of one another.

While the invention has been described with reference to its presently-preferred embodiment, it is not limited thereto. Rather it is limited only insofar as it is defined by the following set of patent claims and includes within its scope all equivalents thereof.

The invention claimed is:

1. A microelectromechanical sensor, comprising:
    at least one movable electrode,
    an electrode arrangement spaced apart from the movable electrode and having a plurality of electrodes which can be driven separately and to which corresponding electrode signals can be applied, wherein the electrode signals can be used to electrostatically set/change the application of force to the movable electrode, a spring constant of an electrostatically generated spring force and a read-out factor of the resonator,
    an electrode signal generation unit, which is connected to the electrode arrangement and can be supplied with a force application signal, a spring constant signal and a read-out factor signal, which define the settings/changes to be brought about with regard to the application of force, spring constant and read-out factor of the movable electrode, wherein the read-out factor is a gain factor for reading out the movement of the movable electrode, and wherein the force application signal generates a force that is independent of a deflection of the movable electrode,
    wherein the electrode signal generation unit generates each electrode signal in a manner dependent on the force application signal, the spring constant signal and the read-out factor signal and matches the electrode signals to one another in such a way that the application of force, the spring constant and the read-out factor of a movable electrode can be set/changed to specific desired values independently of one another.

2. The microelectromechanical sensor as claimed in claim 1, characterized by
    a charge transfer unit, which detects charge transfers occurring on the movable electrode, and
    an evaluation unit, which determines the instantaneous movement of the movable electrode on the basis of the detected charge transfer.

3. The microelectromechanical sensor as claimed in claim 2, characterized
in that the electrode signal generation unit generates each electrode signal in a manner dependent on the force application signal, the spring constant signal and the read-out factor signal in such a way that the charge transfer only contains charge transfer components which originate from the movement of the movable electrode and from the value of the read-out factor.

4. The microelectromechanical sensor as claimed in claim 1, characterized in that the electrode arrangement contains four electrodes.

5. The microelectromechanical sensor as claimed in claim 4, characterized in that the four electrodes are grouped into two electrode pairs, wherein the electrodes are configured axially symmetrically with respect to a first axis, which separates the two electrode pairs, from one another, and axially symmetrically with respect to a second axis, which separates the electrodes of the respective electrode pairs among one another.

6. The microelectromechanical sensor as claimed in claim 5, characterized in that the movable electrode is configured centrosymmetrically with respect to the point of intersection of the two axes of symmetry.

7. The microelectromechanical sensor as claimed in claim 5, characterized in that the electrode signals are given by the following equations:

$$u_{o1} = \sqrt{\Delta\omega - m^2 + f} + m$$

$$u_{o2} = -\sqrt{\Delta\omega - m^2 + f} + m$$

$$u_{u1} = \sqrt{\Delta\omega - m^2 - f} - m$$

$$u_{u2} = -\sqrt{\Delta\omega - m^2 - f} - m$$

where
($\Delta\omega$) represents the value of the spring constant signal,
(m) represents the value of the read-out factor signal,
and (f) represents the value of the force application signal, ($u_{o1}$, $u_{o2}$) represent the values of the electrode signals lying above the second axis, and ($u_{u1}$, $u_{u2}$) represent the values of the electrode signals lying below the second axis.

8. The microelectromechanical sensor as claimed in claim 7, characterized in that the following relation holds true:

$$|f| < \Delta\omega - m^2$$

9. The microelectromechanical sensor as claimed in claim 1, characterized in that the movable electrode is embodied as part of a resonator.

10. The microelectromechanical sensor as claimed in claim 1, characterized by a second movable electrode, which is electrically connected to the at least one movable electrode,
a second electrode arrangement spaced apart from the second movable electrode and having a further plurality of electrodes which can be driven separately and to which corresponding electrode signals can be applied, wherein the electrode signals can be used to electrostatically set/change the application of force to the second movable electrode, a spring constant of an electrostatically generated spring force and a read-out factor of the second movable electrode, wherein the read-out factor is a gain factor for reading out the movement of the second movable electrode, and wherein the force application signal generates a force that is independent of a deflection of the second movable electrode,
a second electrode signal generation unit, which is connected to the second electrode arrangement and can be supplied with a second force application signal, a second spring constant signal and a second read-out factor signal, which define the settings/changes to be brought about with regard to the application of force, spring constant and read-out factor of the second movable electrode,
wherein the second electrode signal generation unit generates each electrode signal in a manner dependent on the second force application signal, the second spring constant signal and the second read-out factor signal and matches the electrode signals to one another in such a way that the second application of force, the second spring constant and the second read-out factor of the second movable electrode can be set/changed to specific desired values independently of one another and independently of the application of force, the spring constant and the read-out factor of the at least one movable electrode.

11. An operating method for a microelectromechanical sensor having at least one movable electrode and an electrode arrangement spaced apart from the movable electrode and having a plurality of electrodes which can be driven separately and to which corresponding electrode signals can be applied, comprising the following steps:
generation of the electrode signals in a manner dependent on a force application signal, a spring constant signal and a read-out factor signal, which define the settings/changes to be effected with regard to the application of force to the movable electrode, spring constant of an electrostatically generated spring force and read-out factor of the movable electrode, wherein the read-out factor is a gain factor for reading out the movement of the movable electrode, and wherein the force application signal generates a force that is independent of a deflection of the movable electrode,
application of the electrode signals to the corresponding electrodes in order to electrostatically set/change the application of force, the spring constant and the read-out factor of the movable electrode,
wherein each electrode signal is generated in a manner dependent on the force application signal, the spring constant signal and the read-out factor signal and the electrode signals are matched to one another in such a way that the application of force, the spring constant and the read-out factor of the movable electrode are set/changed to specific desired values independently of one another.

* * * * *